June 17, 1969          E. E. PERTICS          3,449,895

CATCHING AND GUIDE MEANS IN A BERRY HARVESTER

Filed Jan. 3, 1967          Sheet __1__ of 5

INVENTOR
EMIL E. PERTICS

BY

Eugene C. Knoblock

ATTORNEY

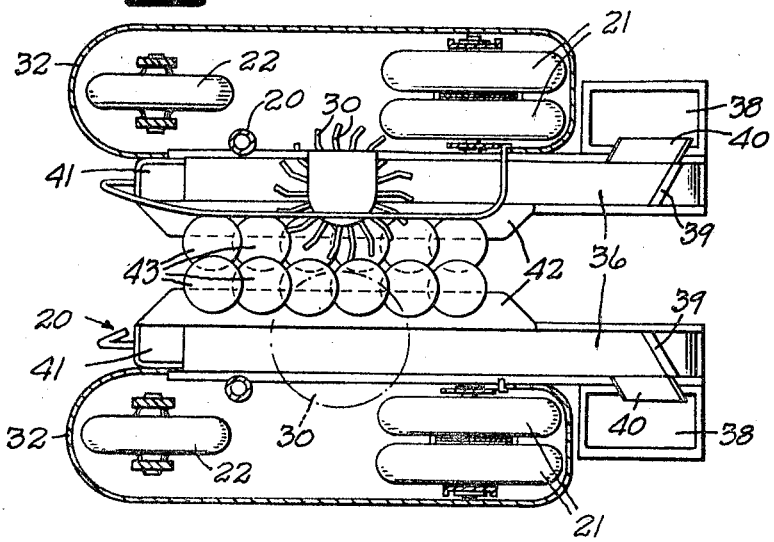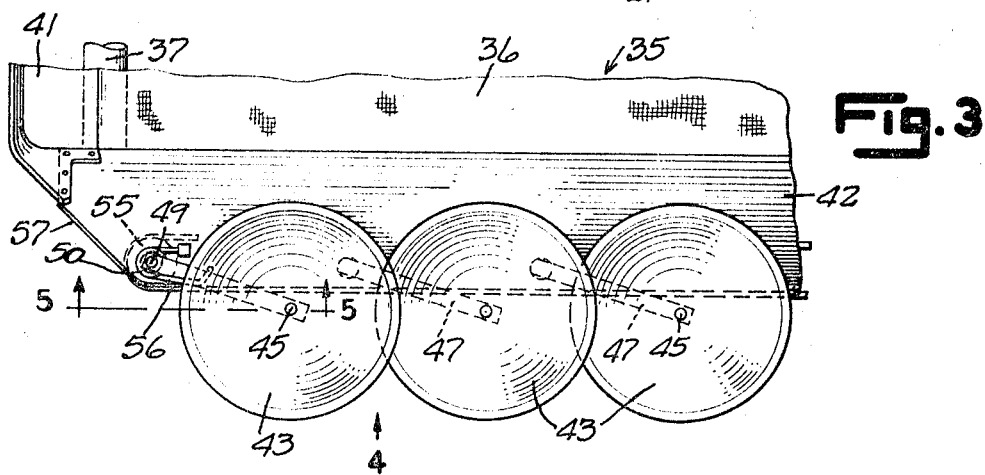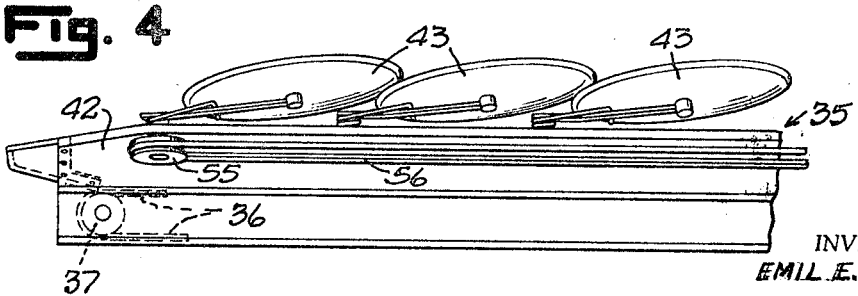

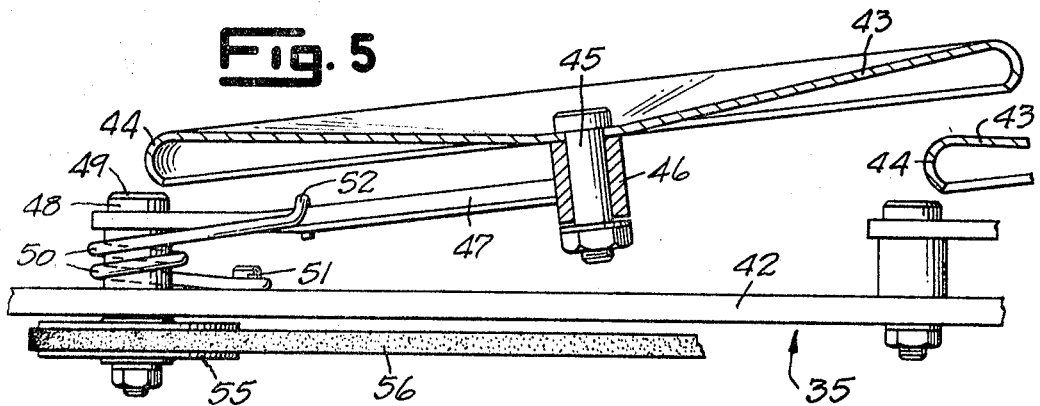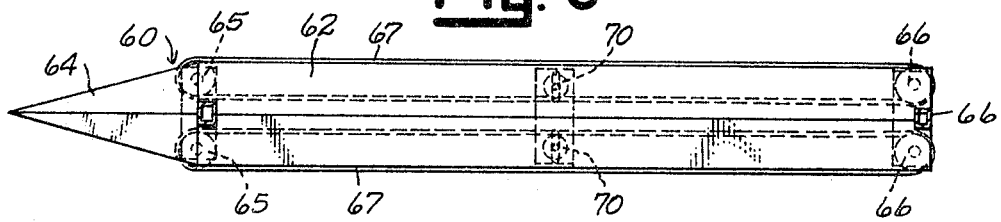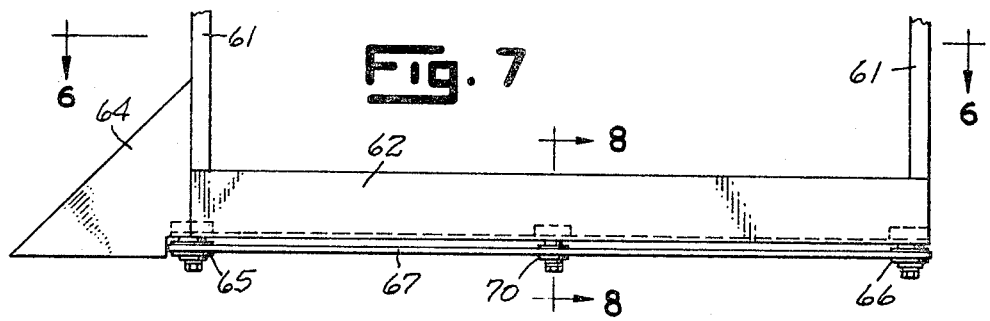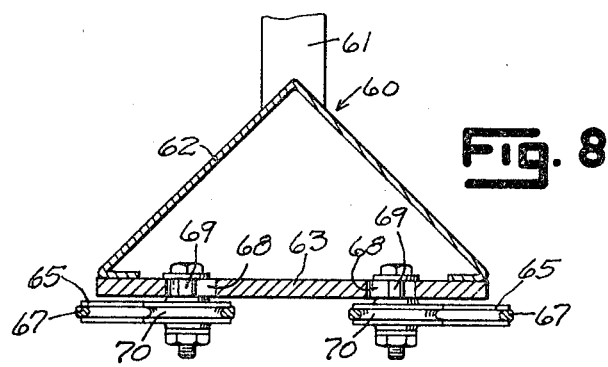

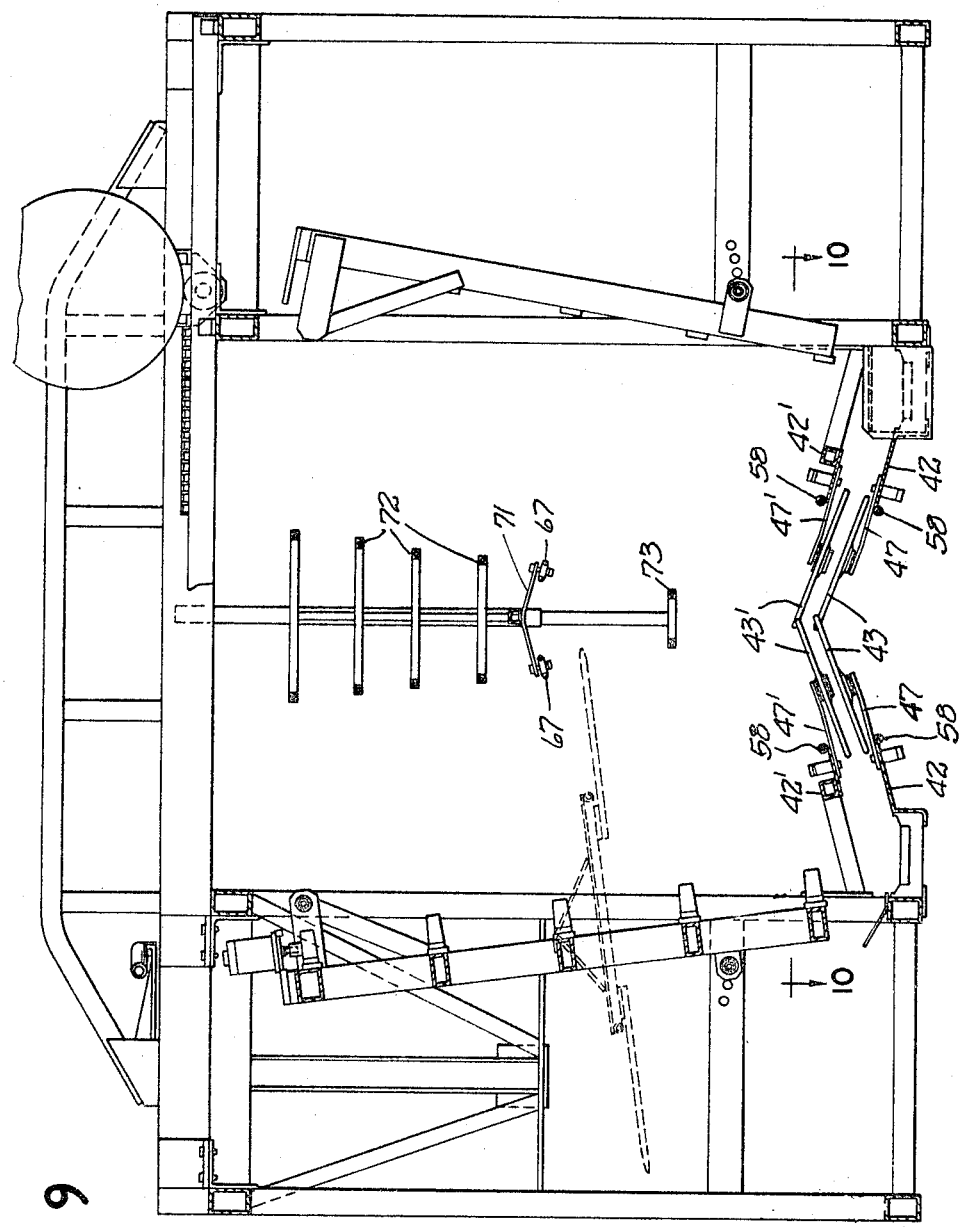

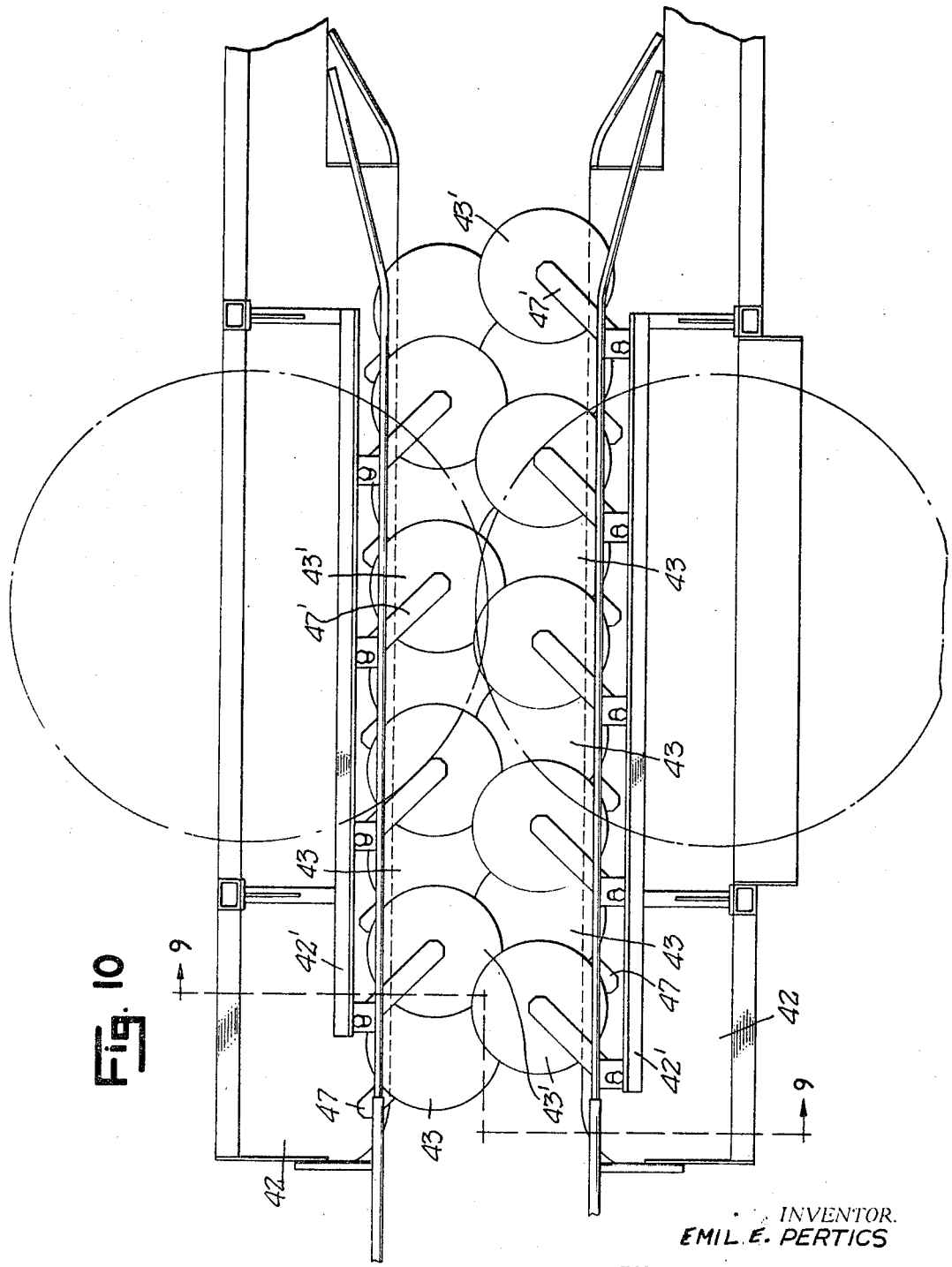

United States Patent Office 3,449,895
Patented June 17, 1969

3,449,895
CATCHING AND GUIDE MEANS IN A BERRY HARVESTER
Emil E. Pertics, P.O. Box 84, La Paz, Ind. 45637
Filed Jan. 3, 1967, Ser. No. 606,841
Int. Cl. A01g 19/00
U.S. Cl. 56—330                          8 Claims

ABSTRACT OF THE DISCLOSURE

A berry harvester travelling astraddle a row of plants and carrying vibrating members operable to release berries from the plants, wherein low level berry-collecting pans are arranged in rows to engage opposite sides of the plants and to discharge berries upon means for delivering them to a collection receptacle, said pans being freely rotatable on spring-positioned arms pivoted to swing laterally, and wherein parts of the device which normally rub against the plants journal idler pulleys around which are trained belts having plant-contacting runs.

This invention relates to improvements in berry harvesters and more particularly to a device for removing and collecting berries, fruits, and other products which grow upon plants, bushes and vines. The invention is an improvement upon the berry picker covered by my U.S. Patent 3,255,578, dated June 14, 1966.

Devices of this character travel along a row of plants, bushes, or vines, as in blueberry and coffee plantations or in vineyards, and straddle the row. They are provided with means to contact the bushes, vines or plants and to vibrate the same to cause the fruits, berries, grapes or coffee beans or like products to be released to fall upon collection means and thence be delivered to a discharge point of the device.

In order that the device may function properly, it is necessary that there be contact between parts of the device and the bushes, plants or vines with respect not only to the vibrating means of the device, but also with respect to other parts, such as the collection means or bush deflecting means which cooperate with the vibrating means to insure effective shaking action upon the bush, vine or plant by the vibrating means. All points at which direct contact between the device and the bush, vine or plant occur have a potential for damaging the bush, vine or plant as the machine moves past the same.

It is the primary object of this invention to minimize the damage to bushes, vines or plants occasioned by contact of parts of the device therewith during the use of the device.

A further object is to provide a device of this character with novel collecting means consisting of two sets of freely rotatable collecting pans successively engaging the bush, plant, or vine and mounted for swinging to permit lateral deflection of the pans relative to the support therefor while maintaining contact with the bush, vine or plant, as the device travels therepast, and wherein the supports for the sets of pans carry freely moving means for contact with the bush, vine or plant.

A further object is to provide a device of this character having bush deflecting or dividing means arranged to pass through a bush or plant so as to move opposite portions of a bush toward adjacent opposed vibrating berry release means, said bush dividing means being characterized by bush contacting parts which are freely movable relative to the device so as to minimize rubbing or scraping contact of the dividing means with the bush during travel of the device past the bush.

Further objects will be apparent from the following specifications:

In the drawings:

FIG. 2 is a horizontal sectional view taken on line 2—2 of FIG. 1.

FIG. 3 is a fragmentary enlarged top plan view illustrating a collector portion of the device.

FIG. 4 is a fragmentary side view of the collector portion, as viewed in the direction of the arrow 4 in FIG. 3.

FIG. 5 is an enlarged fragmentary longitudinal sectional view taken on line 5—5 of FIG. 3.

FIG. 6 is a top plan view of a bush divider mechanism as viewed on line 6—6 of FIG. 7.

FIG. 7 is a side elevational view of the bush divider shown in FIG. 6.

FIG. 8 is an enlarged transverse sectional view taken on line 8—8 of FIG. 7.

FIG. 9 is a fragmentary transverse vertical sectional view illustrating a modified construction of the device and the relation of the bush dividing means and collecting means to the frame of the device and to each other.

FIG. 10 is a fragmentary horizontal sectional view taken on line 10—10 of FIG. 9.

Figure 1:
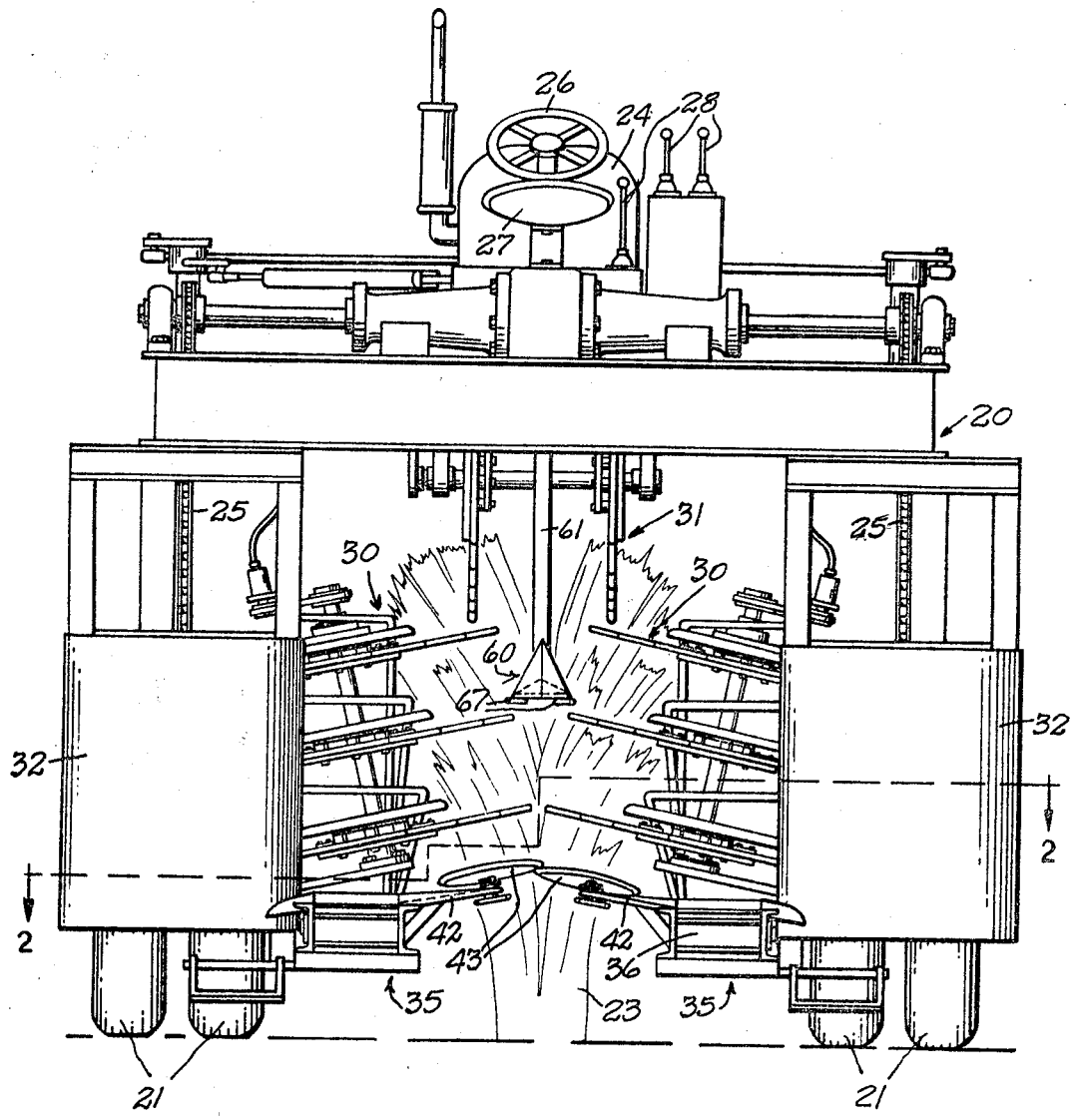
FIG. 1 is a rear end view of a device illustrating one embodiment of my invention.

Referring to the drawings and particularly to FIGS. 1 and 2, which illustrate one embodiment of the invention, the numeral 20 designates a chassis or frame supported by rear ground engaging wheels 21, and front dirigible wheels 22. The frame is of inverted U-shaped providing a clearance space therein permitting it to straddle a bush, vine or plant 23, as seen in FIG. 1. Suitable engine or motive means 24 are supported by the frame, and drive means of suitable type, such as sprockets and chains 25, connect the motive means to the rear wheels to drive the latter. The device has suitable steering means 26 connected to the front wheels 22 convenient to an operator seated upon a seat 27. Suitable drive control means 28 are located within reach of the driver upon the seat 27.

At opposite sides of the device are mounted fingered freely rotatable vibrating units 30, such as illustrated and described in Patent 3,255,578 which are adapted to penetrate and engage a bush or plant 23 straddled by the device. If desired, upper fingered freely rotatable vibrating units 31 may be mounted in the device to engage the portion of the bush or plant above the units 30. Suitable enclosures 32 may be mounted upon the frame to enclose some of the working parts of the device and to protect plants, bushes, or vines in rows adjacent to the row straddled by the device.

At each side thereof, the frame 20 mounts collection means 35 for the berries, fruits, or beans released by the device, the same being located at a level below the vibrating units 30. Each collection means preferably includes a longitudinal collecting belt 36 trained around longitudinally spaced power-driven pulleys 37 and extending rearwardly beyond the frame adjacent to a collection member 38, such as a receptacle into which the fruit or berries collected are diverted by diversion plates 39 and troughs 40. A fixed plate 41 overlies the front end of each belt 36 to direct thereto berries or fruit which falls upon initial contact of the front of the device with the bush. A longitudinal laterally inclined tray 42 extends inwardly and upwardly relative to each belt 36, being carried fixedly by the frame of the device with the outer edge of each tray overlying a belt 36.

The arrangement of the belts, trays and associated parts is shown in FIGS. 3, 4 and 5, from which it will be seen that freely rotatable collection pans or disks 43 are carried by arms pivoted to each tray 42 and normally are located principally between the trays. Each disk 43 preferably has a downturned rounded marginal flange 44 and is preferably of slightly dished shape, as best seen in FIG. 5. Each disk 43 is held in an inclined position, as illustrated in FIG. 5 upon a pivot pin 45 carried by an inclined tubular journal 46 mounted at the end of a pivot arm 47 whose opposite end has a tubular journal 48 supported by a tray 42 adjacent the margin thereof, as by means of a pivot pin 49. The arms 47 are normally held in a selected position projecting beyond the adjacent inner edge of the tray 42, as illustrated in FIGS. 2 and 3, by suitable spring means. As here illustrated the spring means consists of a coil spring 50 encircling the tubular journal 48 and anchored at one end thereof to the tray 42 at 51, and having a releasable hooked connection 52 at its opposite end with pivot arm 47.

The pan or disks 43 are normally arranged in longitudinal rows as illustrated in FIGS. 2, 3 and 4 with portions of adjacent disks in the same row overlapping, and with portions of the disks of one set or row in adjacent or overlapping relation to disks of the other set or row. The disks 43 are free to rotate as they contact and traverse or pass a bush or a plant, and each can bodily move as its mounting arm 47 swings about the pivot axis 48, 49 against the action of spring means 50, 51, 52 as required by the size of the bush or by the position of bush branches engaged by the disks.

Each tray 42 preferably journals a pair of longitudinally spaced idler pulleys 55, said pulleys being located below the tray and projecting slightly beyond the innermost edge of the tray. A belt 56 is trained around each pair of pulleys 55 and has the inner run thereof substantially parallel to and spaced inwardly from the inner edge of the adjacent tray 42.

The front edge 57 of each tray 42 is preferably positioned diagonally to direct the portions of a bush or plant engaged thereby into the throat or passage between the opposite trays 42 and between the opposite sets or rows of the collecting disks or pans 43. After the bushes are deflected inwardly in this fashion, the deflected parts thereof are engaged by the inner runs of the belts 56 until such parts contact the pans or disks 43, whereupon the pans or disks 43 are swung on their pivot arms 47, and also are free to rotate as the device advances. The arrangement is such that when a bush or plant part enters the throat between the trays 42 and engages the belts 56, the belts, being idlers, are free to travel at a rate proportional to the speed of the vehicle, thereby minimizing scraping of the contacted bush parts. Similarly, when the successive disks 43 in each row engage the bush parts, they maintain contact in the bush parts due to the free idling rotation thereof at journal 45, 46, and to the mounting thereof upon the swinging pivot arms 47. This arrangement insures that the pans or disks 43 will be in a position to collect fruits or berries from the parts of the bush thereabove as the berries are released by the vibrating means 30. The inclined positions of the disks deflect the collected berries to a tray 42 on which the berries roll to a collecting belt 36 for delivery to collection receptacle 38.

A modified construction of the collecting means is illustrated in FIGS. 9 and 10, wherein each conveyor belt 36 has associated therewith two sets or rows of freely rotatable collecting disks or pans arranged at different levels and with the adjacent pans in different levels arranged in staggered relation, as illustrated in FIG. 10. The pans of each lower set are journaled by pivot arms 47, mounted to swing on the adjacent tray 42 in substantially the same arrangement described previously, with the exception that the adjacent pans at each level or set may be spaced apart, as shown in FIG. 10, rather than being arranged to overlap as seen in FIG. 3. Pans 43' of a second or upper set are journaled on pivot arms 47' which are pivotally connected on substantially vertical axes to longitudinal frame parts 42' spaced above the adjacent tray 42. Pans 43 and 43' are arranged in staggered relation as shown in FIG. 10. In this construction the trays 42 and 42' omit the mounting of idler belts 56, and in their place utilize longitudinal rolled margin portions 58.

A bush divider 60 may be provided in the device substantially centrally thereof and between the upper portions of the vibrating units 30, as illustrated in FIG. 1. The bush divider may be of the construction illustrated in FIGS. 6, 7 and 8, wherein fore and aft supports 61 project downwardly from the frame 20 and support a longitudinal divider member 62, here shown as substantially triangular cross-section and as including a base plate 63. At the front of the divider is preferably provided a deflector 64 of substantially V-shape in plan and having opposed rearwardly diverging, upwardly converging side portions. A pair of idler pulleys 65 is journaled at the front of the base plate 63, projecting therebelow, and a pair of idler pulleys 66 is journaled at the rear of said base plate. Around the idler pulleys 65, 66 are trained belts 67 whose outer runs extend parallel to and spaced outwardly relative to the sides of the divider 60, as seen in FIGS. 6 and 8. Intermediate the length of the base plate 63 of the divider are provided transverse slots 68 in which are adjustably mounted shafts 69, each mounting a belt tightening pulley 70, preferably engaging the inner run of a belt 67.

It will be apparent that, as the device travels astraddle a row of bushes, the divider enters the upper portions of the bushes and spreads the same to bring them into proximity to the vibrating units 30. Rubbing of the divider against the bush parts is limited to that occurring at the leading part 64. As the remaining parts of the divider reach and pass the bush, the belts 67, which are idlers, move at a rate commensurate with the speed of travel of the machine and thus minimize or avoid frictional contact or rubbing of the divider against the parts of the bush or plant contacted thereby.

In FIG. 9 a modified arrangement and construction of a bush divider is illustrated. In this construction, the mounting of belts 67 upon a divider member 71 is substantially the same as that previously described, and a plurality of additional longitudinally bowed deflectors may be provided as at 72 and 73, above and below the belt carrier member 71. However, optionally, the lower deflector 73 may be eliminated and the upper deflectors may be differently arranged. In each case, the upper and lower deflectors 72 and 73, where used, will preferably converge at their forward ends and ahead of the belts 67.

While the preferred embodiment of the invention has been illustrated and described, it will be understood that changes may be made in the construction within the scope of the appended claims without departing from the spirit of the invention.

I claim:

1. In a harvester comprising a vehicle adapted to straddle plants in a row and having vibrating means engaging the plants to release berries therefrom and also having berry collection means including spaced powered longitudinal conveyors at opposite sides thereof for delivering berries to collection receptacles, the improvements comprising
   spaced laterally, outwardly inclined elongated trays fixedly carried by the vehicle and each located above and inwardly of a conveyor for discharging berries on to said conveyor,
   a plurality of arms pivoted at longitudinally spaced points of each tray to swing laterally of said vehicle,
   spring means normally positioning each arm yieldingly in rearwardly, inwardly projecting relation to the tray which mounts the arm, and
   a pan journaled on the free end of each arm on an axis inclined laterally whereby to discharge upon a tray the berries falling thereon from said plants,
   each pan being normally positioned to partially overlie a tray and to project inwardly from said tray for engagement with said plants.

2. A harvester as defined in claim 1, wherein each pan constitutes a dished disk journaled at its center.

3. A harvester as defined in claim 1, wherein each pan is circular and centrally journaled and has a downturned plant-engaging margin.

4. A harvester as defined in claim 1, and pair of longitudinally spaced idler pulleys journaled on each tray adjacent the front and rear ends thereof, and
a belt trained around each pair of pulleys and including a plant-engaging run spaced inwardly from the tray mounting the pulley pair.

5. A harvester as defined in claim 1, and a pair of pulleys journaled on each tray adjacent its ends, said pulleys projecting partially from the inner edge of the tray,
a belt trained around each pair of pulleys and having an inner plant-engaging run substantially parallel to the adjacent tray and an outer run, and
belt-tightening means carried by each tray and engaging the outer belt run.

6. In a harvester comprising a vehicle adapted to straddle plants in a row and having a frame mounting vibrating means engaging the plants to release berries therefrom, and berry collecting means for delivering berries to a collection receptacle, said frame including a fixed longitudinally extending part located to engage and rub against the plants, the improvement comprising
a pair of longitudinally spaced idler pulleys journaled on said fixed plant-engaging part and projecting beyond a plant-engaging surface thereof, and
a belt trained around each pair of pulleys and including a plant-engaging run spaced from said frame part and extending parallel to the direction of travel of said vehicle.

7. A harvester as defined in claim 6, wherein said fixed frame part includes spaced elongated low level longitudinal trays, each tray mounting a pair of said idler pulleys.

8. A harvester as defined in claim 6, wherein said fixed frame part constitutes a plant divider adapted to enter a plant and laterally deflect opposite parts thereof, and said plant divider journals two pairs of idler pulleys positioned adjacent opposite sides of said dividers and each having a belt trained thereon with a plant-engaging run thereof outwardly spaced from each side of the divider.

References Cited

UNITED STATES PATENTS

| 2,560,974 | 7/1951 | May | 56—14 |
| 3,126,692 | 3/1964 | Weygandt et al. | 56—330 |
| 3,184,908 | 5/1965 | Rust | 56—330 |
| 3,187,493 | 6/1965 | Harrett | 56—330 |
| 3,255,578 | 6/1966 | Pertics | 56—330 |
| 3,323,296 | 6/1967 | Starkey | 56—42 |
| 3,325,984 | 6/1967 | Christie et al. | 56—330 |

RUSSELL R. KINSEY, *Primary Examiner.*